US012688729B2

(12) United States Patent
Tanaka et al.

(10) Patent No.: US 12,688,729 B2
(45) Date of Patent: Jul. 21, 2026

(54) INFORMATION PROCESSING APPARATUS, INFORMATION PROCESSING METHOD, AND STORAGE MEDIUM FOR REGISTRATION OF INFORMATION TO BE USED FOR COLLATION PROCESSING

(71) Applicant: CANON KABUSHIKI KAISHA, Tokyo (JP)

(72) Inventors: Shoji Tanaka, Kanagawa (JP); Hiroshi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 499 days.

(21) Appl. No.: 18/331,677

(22) Filed: Jun. 8, 2023

(65) Prior Publication Data

US 2023/0401892 A1 Dec. 14, 2023

(30) Foreign Application Priority Data

Jun. 13, 2022 (JP) ................................. 2022-094980

(51) Int. Cl.
*G06V 40/16* (2022.01)
*G06T 7/20* (2017.01)
(Continued)

(52) U.S. Cl.
CPC .............. *G06V 40/172* (2022.01); *G06T 7/20* (2013.01); *G06V 10/44* (2022.01); *G06V 10/60* (2022.01);
(Continued)

(58) Field of Classification Search
CPC ...... G06V 40/172; G06V 10/44; G06V 10/60; G06V 10/761; G06V 40/161;
(Continued)

(56) References Cited

U.S. PATENT DOCUMENTS

2013/0207779 A1* 8/2013 Uno ........................ G06V 40/50
340/5.82
2021/0312166 A1* 10/2021 Yuan ...................... G06N 3/045
(Continued)

FOREIGN PATENT DOCUMENTS

JP 2010092119 A 4/2010
WO WO-2020261906 A1 * 12/2020 ............. G06V 10/82

*Primary Examiner* — Wassim Mahrouka

(74) *Attorney, Agent, or Firm* — Canon U.S.A., Inc. IP Division

(57) ABSTRACT

An information processing apparatus is provided and includes a first extraction unit configured to perform first extraction processing on an image of a registration target, the first extraction processing extracting first feature information indicating a feature of the registration target, a second extraction unit configured to perform second extraction processing on the image of the registration target, the second extraction processing extracting second feature information, a comparison unit configured to compare the first feature information with the second feature information, and a registration unit configured to register registration information associated with the registration target, the registration information indicating which one of the first extraction processing and the second extraction processing is to be used for collation processing based on a result of comparison by the comparison unit.

20 Claims, 6 Drawing Sheets

(51) Int. Cl.
    *G06V 10/44*        (2022.01)
    *G06V 10/60*        (2022.01)
    *G06V 10/74*        (2022.01)

(52) U.S. Cl.
    CPC .......... *G06V 10/761* (2022.01); *G06V 40/161*
            (2022.01); *G06T 2207/30201* (2013.01)

(58) Field of Classification Search
    CPC ...... G06V 10/235; G06V 10/62; G06V 10/87;
           G06V 40/168; G06V 10/82; G06T 7/20;
              G06T 2207/30201; G06T 7/73; G06T
              2207/20081; G06T 2207/20084; G06T
                  2207/30196; G06T 2207/30232
    See application file for complete search history.

(56)                   References Cited

U.S. PATENT DOCUMENTS

2021/0334571 A1 * 10/2021 Thieme ................ G06V 30/248
2022/0012528 A1 *  1/2022 Kawase ................. G06V 40/16
2022/0114837 A1 *  4/2022 Yamamoto ........... G06V 40/172

* cited by examiner

INFORMATION PROCESSING APPARATUS, INFORMATION PROCESSING METHOD, AND STORAGE MEDIUM FOR REGISTRATION OF INFORMATION TO BE USED FOR COLLATION PROCESSING

BACKGROUND

Field

The present disclosure relates to an information processing technique for registration of information to be used for collation processing, and the collation processing.

Description of the Related Art

In recent years, an image recognition technique based on deep learning has been used in many cases in person recognition that performs collation processing to determine whether a person appearing in an image matches a registered person. In the image recognition technique based on deep learning, feature information is extracted from a face image of a person by use of a learning model using a neural network (hereinafter abbreviated as NN). In particular, the use of a large-scale and complicated learning model using a NN makes it possible to extract feature information with a high level of expressiveness and high accuracy from a face image of a person. However, the use of a large-scale and complicated learning model causes an increase in processing time for image recognition. While the use of a smaller-scale learning model leads to a reduction in the processing time for image recognition, the feature information extracted from a face image of a person may have a low level of expressiveness and low recognition accuracy, which is undesirable for users.

Japanese Patent Application Laid-Open No. 2010-92119 discusses a technique for performing collation processing at multiple stages by use of a higher-speed collation unit with a lower accuracy and a lower-speed collation unit with a higher accuracy. Specifically, Japanese Patent Application Laid-Open No. 2010-92119 discusses a technique for performing collation (recognition) processing in which recognition targets are narrowed down by use of the higher-speed collation unit with a lower accuracy and then the collation unit is changed to the lower-speed collation unit with a higher accuracy.

In the technique discussed in Japanese Patent Application Laid-Open No. 2010-92119, the recognition targets are narrowed down by use of the higher-speed collation unit with a lower accuracy, and then the collation (recognition) processing is performed after the collation unit is changed to the lower-speed collation unit with a higher accuracy. Therefore, a certain level of collation accuracy can be ensured, but the processing time is extremely long.

SUMMARY

The present disclosure is directed to reducing a processing time while maintaining a high accuracy during collation processing. According to an aspect of the present disclosure, an information processing apparatus includes at least one memory storing instructions, and at least one processor that, upon execution of the instructions, is configured to operate as a first extraction unit configured to perform first extraction processing on an image of a registration target, the first extraction processing extracting first feature information indicating a feature of the registration target, a second extraction unit configured to perform second extraction processing on the image of the registration target, the second extraction processing extracting second feature information, a comparison unit configured to compare the first feature information with the second feature information, and a registration unit configured to register registration information associated with the registration target, the registration information indicating which one of the first extraction processing and the second extraction processing is to be used for collation processing based on a result of comparison by the comparison unit.

Further features of the present disclosure will become apparent from the following description of exemplary embodiments with reference to the attached drawings.

DESCRIPTION OF THE EMBODIMENTS

Figure 1:
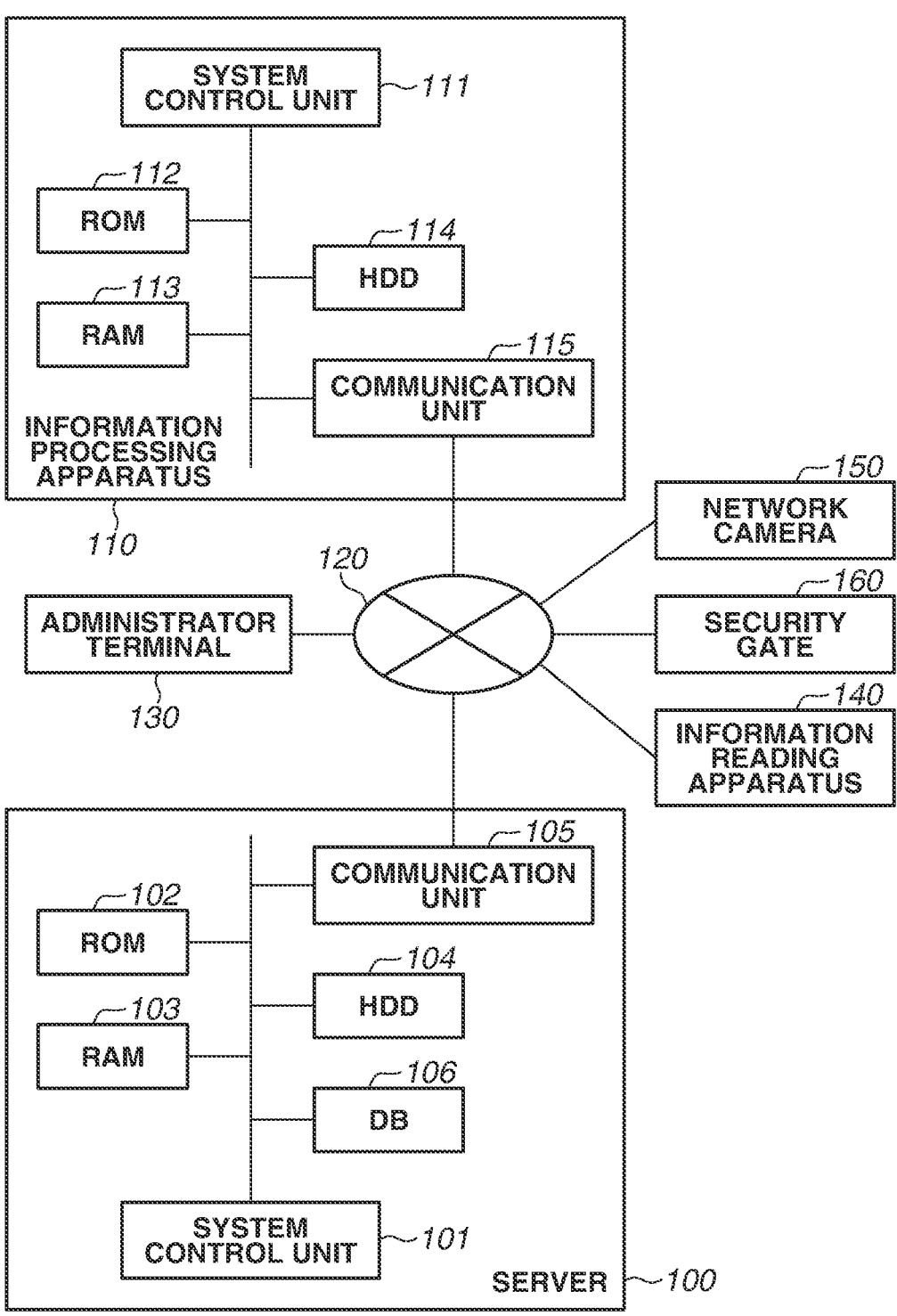
FIG. 1 is a block diagram illustrating a configuration example of a system including an information processing apparatus.

Exemplary embodiments of the present disclosure will be described below with reference to the drawings. The following exemplary embodiments are not intended to limit the present disclosure, and not all combinations of features described in the exemplary embodiments are necessarily deemed to be essential. The configurations of the exemplary embodiments can be appropriately modified or changed depending on the specifications of the apparatus to which the present disclosure is applied and various conditions (usage conditions, usage environment, etc.). Some of the exemplary embodiments to be described below may be combined as appropriate. In the following exemplary embodiments, the same components are denoted by the same reference numerals.

System Configuration Example

FIG. 1 is a block diagram illustrating a configuration example of a recognition system including an information processing apparatus according to a first exemplary embodiment.

An information processing apparatus 110 includes a system control unit 111, a read-only memory (ROM) 112, a random access memory (RAM) 113, a hard disk drive (HDD) 114, and a communication unit 115. The system control unit 111 includes, for example, a central processing unit (CPU), and reads control programs stored in the ROM 112 to execute various processing. A graphics processing unit (GPU) may be used in place of the CPU. The RAM 113 is used as a temporary storage area such as a main memory or a work area for the system control unit 111. The HDD 114 stores various data, various programs, and the like. An information processing program for the information processing apparatus 110 according to the present exemplary embodiment is stored in the ROM 112 or the HDD 114. Specifically, functions and processes associated with the present exemplary embodiment to be described below are implemented by the system control unit 111 reading the information processing program stored in the ROM 112 or the HDD 114 and executing the information processing program. The communication unit 115 is configured to communicate with a server 100 via a network 120.

The server 100 includes a system control unit 101, a ROM 102, a RAM 103, an HDD 104, a communication unit 105, and a database (hereinafter abbreviated as DB) 106. The system control unit 101 includes a CPU, and reads control programs stored in the ROM 102 to execute various processing. The RAM 103 is used as a temporary storage area such as a main memory or a work area for the system control unit 101. The HDD 104 stores various data, various programs, and the like. The DB 106 stores necessary data to be managed. The data to be stored in the DB 106 may be stored in the HDD 104. The communication unit 105 is configured to communicate with the information processing apparatus 110 via the network 120.

A registration system according to the present exemplary embodiment performs person recognition processing using a face image of a person, for example, in entry and exit management when the person passes through a security gate, to thereby perform person collation processing to check whether the person matches a registered person. Accordingly, the recognition system according to the present exemplary embodiment includes not only the information processing apparatus 110 and the server 100 described above, but also a network camera 150, an information reading apparatus 140, a security gate 160, and an administrator terminal 130. The network camera 150, the information reading apparatus 140, the security gate 160, and the administrator terminal 130 are connected in a communicable manner to the server 100 and the information processing apparatus 110 via the network 120. The network 120 is not limited to a wired network, but also may include a wireless network. The network camera 150 is an image capturing apparatus that is installed, for example, in front of the security gate 160 and captures an image of each person. The information reading apparatus 140 obtains identification information, which corresponds to the person and is preliminarily registered, from an identification (ID) card or a portable information terminal such as a smartphone owned by the person. The administrator terminal 130 is an information terminal such as a personal computer owned by an administrator who manages the recognition system. While the present exemplary embodiment describes the example of the entry and exit management at the security gate 160, the present exemplary embodiment can also be applied to, for example, payment during purchase of an item at a store. In this case, the network camera 150 is installed, for example, in front of a cash register. The administrator terminal 130 may be placed, for example, in the vicinity of the security gate 160 or the cash register, or may be located in a management center or the like. The administrator terminal 130 may be, for example, a portable information terminal such as a smartphone or a tablet terminal owned by the administrator.

The present exemplary embodiment describes an example where face feature information (hereinafter referred to as a feature amount) extracted from a face image of a person is used for person recognition in which collation processing is performed to determine whether a person of a recognition target matches a registered person who is preliminarily registered. The present exemplary embodiment also describes an example where, in the case of extracting the feature amount of the face from the face image of the person, image recognition processing is performed by use of a learning model using a neural network (hereinafter abbreviated as NN) by deep learning. Specifically, the information processing apparatus to be used for person recognition extracts the face feature amount using a learning model from the face image of the person captured by a camera, and compares the extracted feature amount with the face feature amount of the person preliminarily registered, thereby determining whether the person matches the registered person. However, in general, the learning model using the NN, based on which feature extraction processing can be performed with high accuracy, requires large-scale and complicated processing with a large calculation amount. Accordingly, the information processing apparatus uses a large number of memories and calculation resources. On the other hand, many information processing apparatuses installed on site where the person recognition is actually performed do not include sufficient memories and calculation resources.

In view of the above, in the recognition system according to the present exemplary embodiment, in the case of registering a person of a registration target, the information processing apparatus 110 extracts the face feature amount from a face image of the person of the registration target using at least two learning models of the NN with different calculation amounts. In the present exemplary embodiment, two learning models, i.e., a large and complicated learning model of the NN with a large calculation amount and a small-scale learning model with a small calculation amount that is obtained by applying knowledge distillation to the NN of the large and complicated learning model, are used as the learning models with different calculation amounts. These learning models will be described in detail below. Further, the information processing apparatus 110 compares the feature amounts extracted for respective learning models, and sets one of the learning models to be used for collation processing to be subsequently performed based on a comparison result. The information processing apparatus 110 generates registration information by associating model information indicating which one of the learning models is to be used for collation processing, identification information about the person of the registration target, and the face feature amount of the person. The registration information is sent to the server 100, and the server 100 stores the registration information in the DB 106.

In the recognition system according to the present exemplary embodiment, in the case of performing collation processing to determine whether the person of the recognition target matches the registered person, the information processing apparatus 110 obtains the registration information from the DB 106 in the server 100 based on the identification information about the person of the recognition target. Further, the information processing apparatus 110 extracts the feature amount from the face image of the person of the recognition target using the learning model indicated by the model information in the registration information. The information processing apparatus 110 compares the feature amount extracted from the face image of the person of the recognition target using the learning model corresponding to the model information in the registration information with the feature amount in the registration information, thereby performing collation processing to determine whether the person of the recognition target matches the registered person.

<Functional Block Configuration>

Figure 2A:
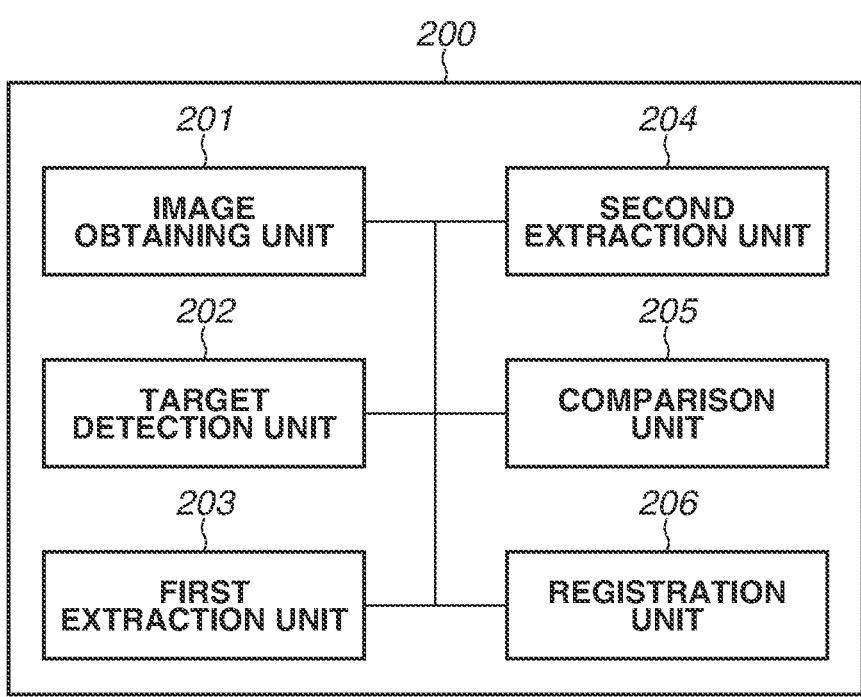
FIG. 2A is a block diagram illustrating a functional configuration example of a registration apparatus.
Figure 2B:
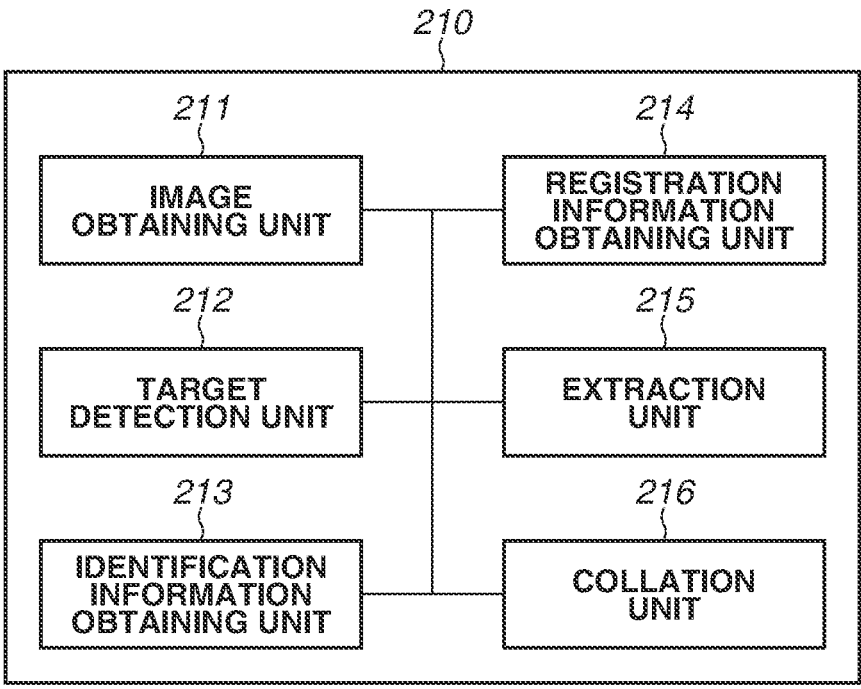
FIG. 2B is a block diagram illustrating a functional configuration example of a recognition apparatus.

The information processing apparatus 110 according to the present exemplary embodiment is configured to execute one or both of the functions of a registration apparatus for registering a person of a registration target and a collation apparatus for performing collation processing to determine whether the person of the recognition target matches the registered person. FIG. 2A is a block diagram illustrating a functional configuration example when the information processing apparatus 110 according to the present exemplary embodiment functions as a registration apparatus 200. FIG. 2B is a block diagram illustrating a functional configuration example when the information processing apparatus 110 according to the present exemplary embodiment functions as a collation apparatus 210.

The present exemplary embodiment describes an example where both of the functions of the registration apparatus 200 and the collation apparatus 210 are implemented by the information processing apparatus 110 illustrated in FIG. 1. In another example, the function of the registration apparatus 200 may be implemented by the server 100, and the function of the collation apparatus 210 may be implemented by the information processing apparatus 110. In yet another example, the functions of the registration apparatus 200 and the collation apparatus 210 may be shared between the information processing apparatus 110 and the server 100 as needed. The functions of the registration apparatus 200 and the collation apparatus 210 may also be implemented by a CPU (system control unit 111, etc.) executing the information processing program according to the present exemplary embodiment. Some or all of the functions may be implemented by a hardware configuration.

The registration apparatus 200 generates registration information about a person of a registration target. For example, the registration apparatus 200 includes an image obtaining unit 201, a target detection unit 202, a first extraction unit 203, a second extraction unit 204, a comparison unit 205, and a registration unit 206.

The collation apparatus 210 performs collation (i.e., identification) processing to determine whether the person of the recognition target matches the registered person, and includes an image obtaining unit 211, a target detection unit 212, an identification information obtaining unit 213, a registration information obtaining unit 214, an extraction unit 215, and a collation unit 216. In the present exemplary embodiment, a person who enters the security gate 160 is set as the person of the recognition target, and identification processing is performed by use of registration information to determine whether the person of the recognition target matches the registered person. For example, the collation apparatus 210 performs collation processing as security measures against a case where, for example, an unregistered person tries to enter the security gate 160 while pretending to be the registered person.

First, a case where the information processing apparatus 110 according to the present exemplary embodiment operates as the registration apparatus 200 will be described.

The image obtaining unit 201 of the registration apparatus 200 obtains an image captured by the network camera 150. The image obtaining unit 201 may include the network camera 150. The image obtaining unit 201 obtains a captured image of the person of the registration target. The image obtained by the image obtaining unit 201 may be an image of a frame forming a moving image, or may be a still image.

The target detection unit 202 detects an image of a face region (referred to as a face image) of the person of the registration target from the image obtained by the image obtaining unit 201.

The first extraction unit 203 extracts a first feature amount by performing first feature amount extraction processing from the face image detected by the target detection unit 202. As described in detail below, in the present exemplary embodiment, the first feature amount extraction processing is processing of extracting the face feature amount (first feature amount) using a large-scale and complicated learning model of the NN with a large calculation amount. In the present exemplary embodiment, the learning model of the NN used for the first feature amount extraction processing to extract the first feature amount from the face image is hereinafter referred to as a first model or a first learning model. The first model will be described in detail below.

The second extraction unit 204 extracts a second feature amount from the face image detected by the target detection unit 202 by performing second feature amount extraction processing that is smaller-scale processing with a smaller calculation amount than the first feature amount extraction processing. As described in detail below, the second feature amount is feature information indicating a feature similar to the first feature amount, and the second feature amount is obtained as a feature amount comparable to the first feature amount. Similarly, as described in detail below, in the present exemplary embodiment, the second feature amount extraction processing is extraction processing using a smaller-scale learning model with a smaller calculation amount than the first model used in the first feature amount extraction processing.

In the present exemplary embodiment, the learning model of the NN used for the second feature amount extraction processing to extract the second feature amount from the face image is hereinafter referred to as a second model or a second learning model. The second model will be described in detail below.

The comparison unit 205 compares the first feature amount extracted by the first extraction unit 203 with the second feature amount extracted by the second extraction unit 204, and generates model information indicating which one of the first and second models is to be used for feature amount extraction processing during collation processing based on the comparison result. In other words, the comparison unit 205 generates information indicating which one of the first feature amount extraction processing and the second feature amount extraction processing is performed during collation processing based on the result of comparison between the first feature amount and the second feature amount. The processing of comparing the first feature amount with the second feature amount by the comparison unit 205 will be described in detail below.

The registration unit 206 generates registration information by associating the feature amount and the model information with the identification information about the person of the registration target detected by the target detection unit 202. The identification information about the person is information unique to each person of the registration target. In the present exemplary embodiment, identification information (ID data etc.) preliminarily registered in an ID card or a portable information terminal such as a smartphone owned by the person is used. Both the first feature amount and the second feature amount may be included as information about the feature amount in the registration information. However, in the present exemplary embodiment, the feature amount corresponding to the model information is used. The registration information in which the feature amount and the model information are associated with the identification information is sent to the server 100 from the information processing apparatus 110 via the communication unit 115, and is stored in the DB 106. In the present exemplary embodiment, the registration information is generated by the information processing apparatus 110, but instead may be generated by the server 100 and stored in the DB 106.

Next, a case where the information processing apparatus 110 according to the present exemplary embodiment operates as the collation apparatus 210 will be described.

The image obtaining unit 211 of the collation apparatus 210 obtains an image captured by the network camera 150. The image obtaining unit 211 of the collation apparatus 210 may include the network camera 150. The image obtaining unit 211 of the collation apparatus 210 obtains a captured image of the person of the recognition target. The image obtained by the image obtaining unit 211 may be an image of a frame forming a moving image, or may be a still image.

The target detection unit 212 detects a face image of the person of the recognition target from the image obtained by the image obtaining unit 211.

The identification information obtaining unit 213 obtains identification information (ID data etc.) that corresponds to the person of the recognition target and is preliminarily registered, from an ID card or a portable information terminal such as a smartphone owned by the person.

The registration information obtaining unit 214 receives the identification information from the identification information obtaining unit 213, and obtains the registration information associated with the identification information from the DB 106 in the server 100. The registration information is information in which the feature amount and the model information are associated with the identification information in the registration apparatus 200 as described above.

The extraction unit 215 obtains the model information corresponding to the identification information obtained by the identification information obtaining unit 213 from the registration information obtained by the registration information obtaining unit 214. As described in detail below, if the model information indicates the first model, the extraction unit 215 performs feature amount extraction processing using the first model on the face image of the person of the recognition target, i.e., processing to extract the first feature amount through the first feature amount extraction processing. On the other hand, if the model information indicates the second model, the extraction unit 215 performs feature amount extraction processing using the second model on the face image of the person of the recognition target, i.e., processing to extract the second feature amount through the second feature amount extraction processing.

The collation unit 216 obtains a feature amount from the registration information obtained by the registration information obtaining unit 214, and obtains a similarity between the feature amount and the feature amount extracted by the extraction unit 215, thereby performing collation processing to determine whether the person of the recognition target matches the registered person. As described in detail below, if the model information indicates the first model, the collation unit 216 performs collation processing based on the similarity between the first feature amount extracted by the extraction unit 215 by use of the first model from the face image of the person of the recognition target and the first feature amount in the registration information. On the other hand, if the model information indicates the second model, the collation unit 216 performs collation processing based on the similarity between the second feature amount extracted by the extraction unit 215 by use of the second model from the face image of the person of the recognition target and the second feature amount in the registration information.

Figure 3:
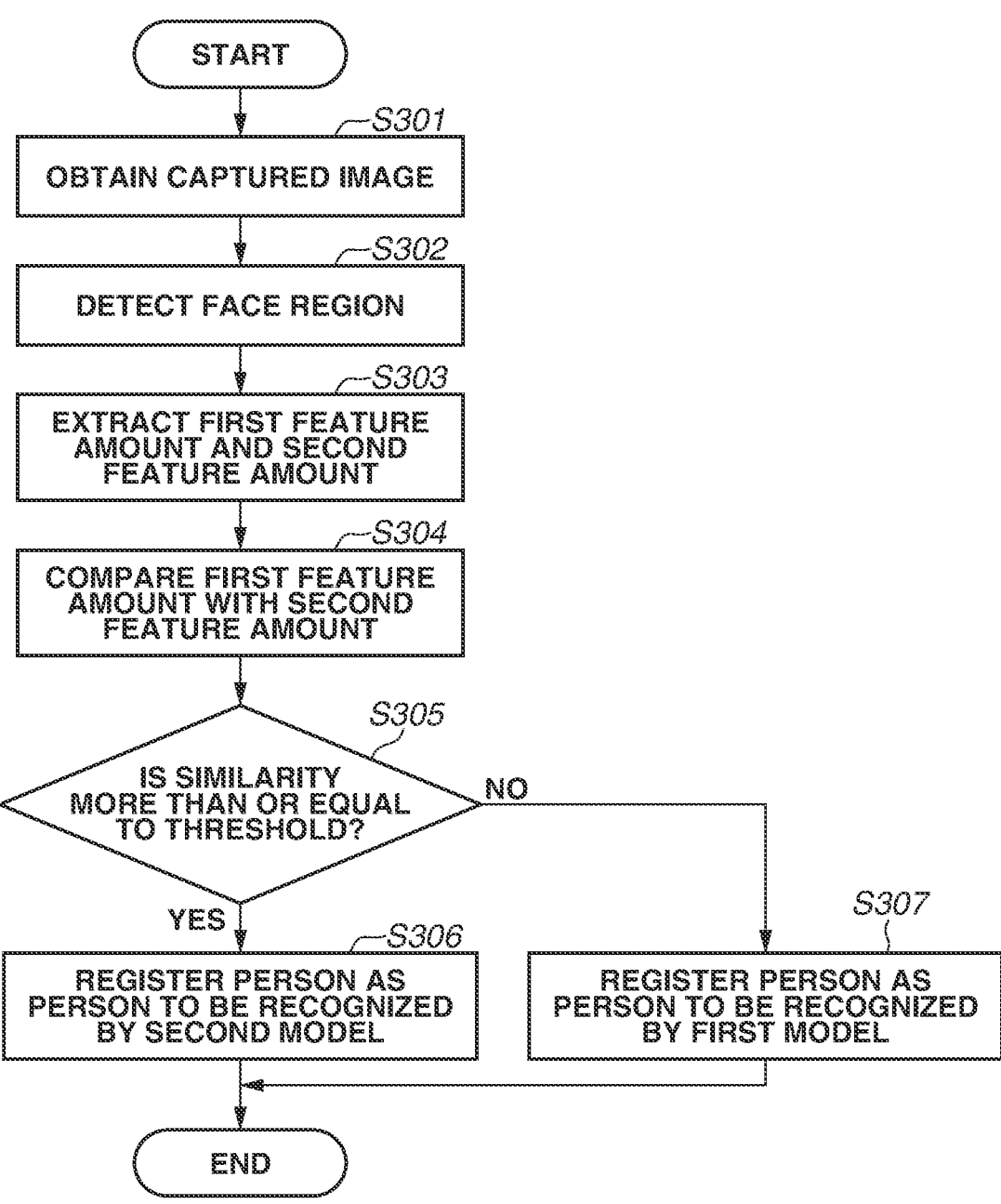
FIG. 3 is a flowchart illustrating a flow of registration processing.

FIG. 3 is a flowchart illustrating a flow of registration processing to be executed by the registration apparatus 200.

First, in step S301, the image obtaining unit 201 of the registration apparatus 200 obtains an image including a face image of the person of the registration target from the network camera 150 that is installed, for example, in front of the security gate 160. The face image of the person obtained by the image obtaining unit 201 of the registration apparatus 200 may be an image that is captured in advance and stored in, for example, a memory in an ID card, an image stored in a portable information terminal such as a smartphone, or an image stored in another image server or the like.

Next, in step S302, the target detection unit 202 detects, as the face image, a face region of the person from the image obtained by the image obtaining unit 201. A known technique may be used as a technique for detecting an image of the face region. Examples of the technique include a detection method based on preset facial features such as eyes, nose, and mouse, and a method of detecting a face region by learning as typified by deep learning.

Next, in step S303, the first extraction unit 203 extracts the first feature amount from the face image detected by the target detection unit 202, and the second extraction unit 204 extracts the second feature amount from the face image detected by the target detection unit 202.

As described above, the first extraction unit 203 extracts the first feature amount using the pre-learned first model learned, to be specific, the first model of the NN that uses large-scale and complicated processing with a large calculation amount in the present exemplary embodiment. Since the first model is the learning model of the NN that uses large-scale and complicated processing with a large calculation amount, the first feature amount extracted by the first extraction unit 203 is more likely to have high expressiveness and high accuracy.

As described above, the second extraction unit 204 extracts the second feature amount using the pre-learned second model, to be specific, the second model of the NN that is a smaller-scale learning model with a smaller calculation amount than the first model in the present exemplary embodiment. Since the second model is a learning model of the NN with a smaller calculation amount, the second feature amount extracted by the second extraction unit 204 may have a lower level of expressiveness and lower accuracy than the first feature amount.

In the present exemplary embodiment, the second model is a learning model obtained by application of what is called knowledge distillation to the NN of the large-scale first model with a large calculation amount. The knowledge distillation (hereinafter abbreviated as distillation) is a known technique of downsizing the NN and reducing the volume of processing. In the distillation, learning is performed by use of an output of a large-scale learning model of the NN (generally referred to as a teacher model), thereby generating a relatively small-scale and light learning model of the NN (generally referred to as a student model).

Specifically, in the distillation, an output of a teacher model and an output of a student model are compared. More specifically, in the present exemplary embodiment, the feature amounts are compared, and a parameter for the student model is adjusted by learning so as to reduce a difference between the feature amounts. For example, when the feature amount extracted by use of the teacher model is represented by v1 and the feature amount extracted by use of the student model is represented by v2, the student model is learned to satisfy |v1−v2|<ε, where ε represents a predetermined value. In other words, in the distillation, the output (feature amount) of the teacher model and the output (feature amount) of the student model are directly compared and learned, so that the feature amount output from the teacher model and the feature amount output from the student model are comparable. Thus, since the student model is a model learned by use of the output of the teacher model, it is highly likely that the feature amount extracted from an image by use of the student model may have substantially the same accuracy as that of the feature amount extracted from the image by use of the teacher model. Accordingly, the distillation of the NN is a technique that is often used in an environment in which machine resources are insufficient, for example, in a case where processing using the NN is performed with an edge device such as a portable information terminal owned by an individual person. However, depending on the image to be used in the feature amount extraction processing, the feature amount extracted by use of the student model and the feature amount extracted by use of the teacher model do not necessarily have the same accuracy.

Next, in step S304, the comparison unit 205 compares the first feature amount extracted by the first extraction unit 203 using the first model with the second feature amount extracted by the second extraction unit 204 using the second model. Specifically, the comparison unit 205 obtains a distance between the first feature amount and the second feature amount. The distance is calculated as a Euclidean distance between the first feature amount (feature vector) and the second feature amount (feature vector) in a feature space. For example, when the first feature amount is represented by v1 and the second feature amount is represented by v2, the distance is a value expressed by ‖V1−V2‖. The processing of obtaining the inter-feature distance between the feature amounts by the comparison unit 205 uses the fact that, as described above, the output of the first model obtained before distillation and the output of the second model obtained after distillation are comparable feature amounts.

Next, in step S305, the comparison unit 205 evaluates which one of the first model and the second model is to be used for collation processing on the person corresponding to the face image detected in step S302 by using the inter-feature distance between the first feature amount and the second feature amount. As described above, the second model obtained after distillation is learned so that the output of the second model matches the output of the first model obtained before distillation. Therefore, it is assumed that the first feature amount and the second feature amount that are extracted from the same image, for example, match. In other words, it is assumed that the value of the inter-feature distance ‖V1−V2‖ is 0. However, in some cases, the first feature amount and the second feature amount do not match depending on the face image from which the feature amounts are extracted.

Accordingly, the comparison unit 205 evaluates which one of the first model and the second model is to be used for the collation processing by determining whether the inter-feature distance between the first feature amount and the second feature amount is less than or equal to a predetermined threshold. The predetermined threshold is a preset value. If the inter-feature distance between the first feature amount and the second feature amount is less than or equal to the threshold, i.e., if the first feature amount and the second feature amount are close to each other, the substantially the same feature amounts can be extracted by use of one of the first model and the second model. On the other hand, if the inter-feature distance between the first feature amount and the second feature amount exceeds the threshold, i.e., if the first feature amount and the second feature amount are far from each other, it is highly likely that the first feature amount obtained by use of the first model may be different from the second feature amount obtained by use of the second model. In other words, if the feature amount is extracted by use of the second model, which is a light model, there is a possibility that a feature amount different from the first feature amount obtained with high accuracy by use of the first model can be extracted.

Accordingly, in the subsequent steps S306 and S307, the registration unit 206 determines which one of the first model and the second model is to be used for collation processing based on the result of comparison by the comparison unit 205 in step S305, and includes the model information corresponding to the determination result in the registration information.

Specifically, for example, if the comparison unit 205 obtains the comparison result indicating that the inter-feature distance between the first feature amount and the second feature amount is less than or equal to the threshold, it can be said that the feature amount of the person obtained by use of the second model is substantially the same as the feature amount thereof obtained by use of the first model. In other words, even when feature amount extraction processing is performed by use of the second model for collation processing on the person for which the comparison result indicates that the inter-feature distance between the first feature amount and the second feature amount is less than or equal to the threshold, a collation error is less likely to occur in the collation processing on the person. For this reason, in step S306, the registration unit 206 includes the model information indicating the second model in the registration information about the person for which the comparison result indicates that the inter-feature distance between the first feature amount and the second feature amount is less than or equal to the threshold. In other words, the person is registered as the person for which the feature amount is extracted using the second model and collation processing is performed during the collation processing.

On the other hand, if the second model is used for collation processing on the person for which the comparison result indicating that the inter-feature distance exceeds the threshold is obtained by the comparison unit 205, the person may not be recognized as the registered person in some cases. Additionally, a collation error may occur where another person is erroneously determined as the registered person. Accordingly, in step S307, the registration unit 206 includes the model information indicating the first model in the registration information about the person for which the comparison result indicating that the inter-feature distance between the first feature amount and the second feature amount exceeds the threshold is obtained by the comparison unit 205. In other words, the person for which the comparison result indicating that the inter-feature distance exceeds the threshold is obtained is registered as the person for which the feature amount is extracted using the first model with a high accuracy and collation processing is performed during the collation processing.

Figure 4:
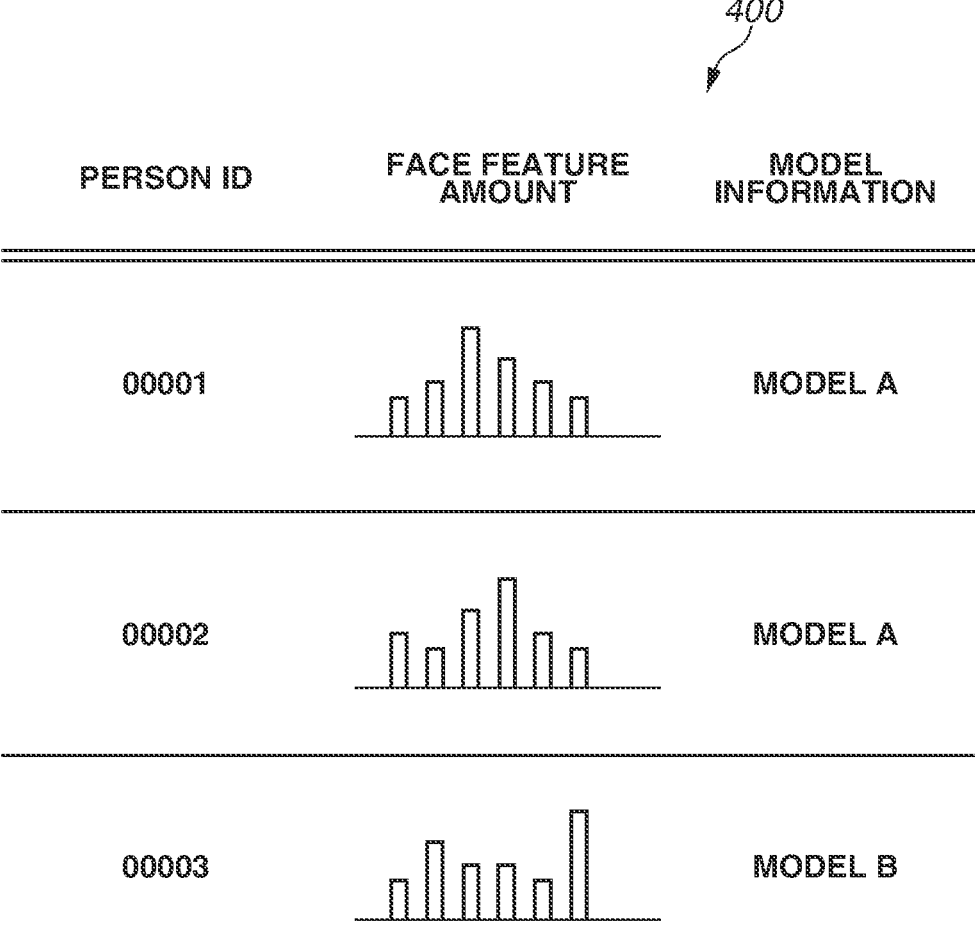
FIG. 4 illustrates an example of registration information.

FIG. 4 schematically illustrates an example of pieces of information registered as registration information 400 in the DB 106 in the server 100. The registration information 400 is information including the feature amount (face feature amount) extracted from the face image of the person of the registration target and the model information indicating which one of the first and second models is to be used as the learning model for collation processing associated with the person ID, which is the identification information about the person. In the example illustrated in FIG. 4, the second model is illustrated as a model A and the first model is illustrated as a model B. For example, 00001, 00002, and 00003 are illustrated as the identification information (person ID) about respective persons. In the case of the registration information 400, the model A (second model) can be used for collation processing on the person with the person ID 00001 and the person with the person ID 00002, and the model B (first model) may be desirably used for collation processing on the person with the person ID 00003.

Figure 5:
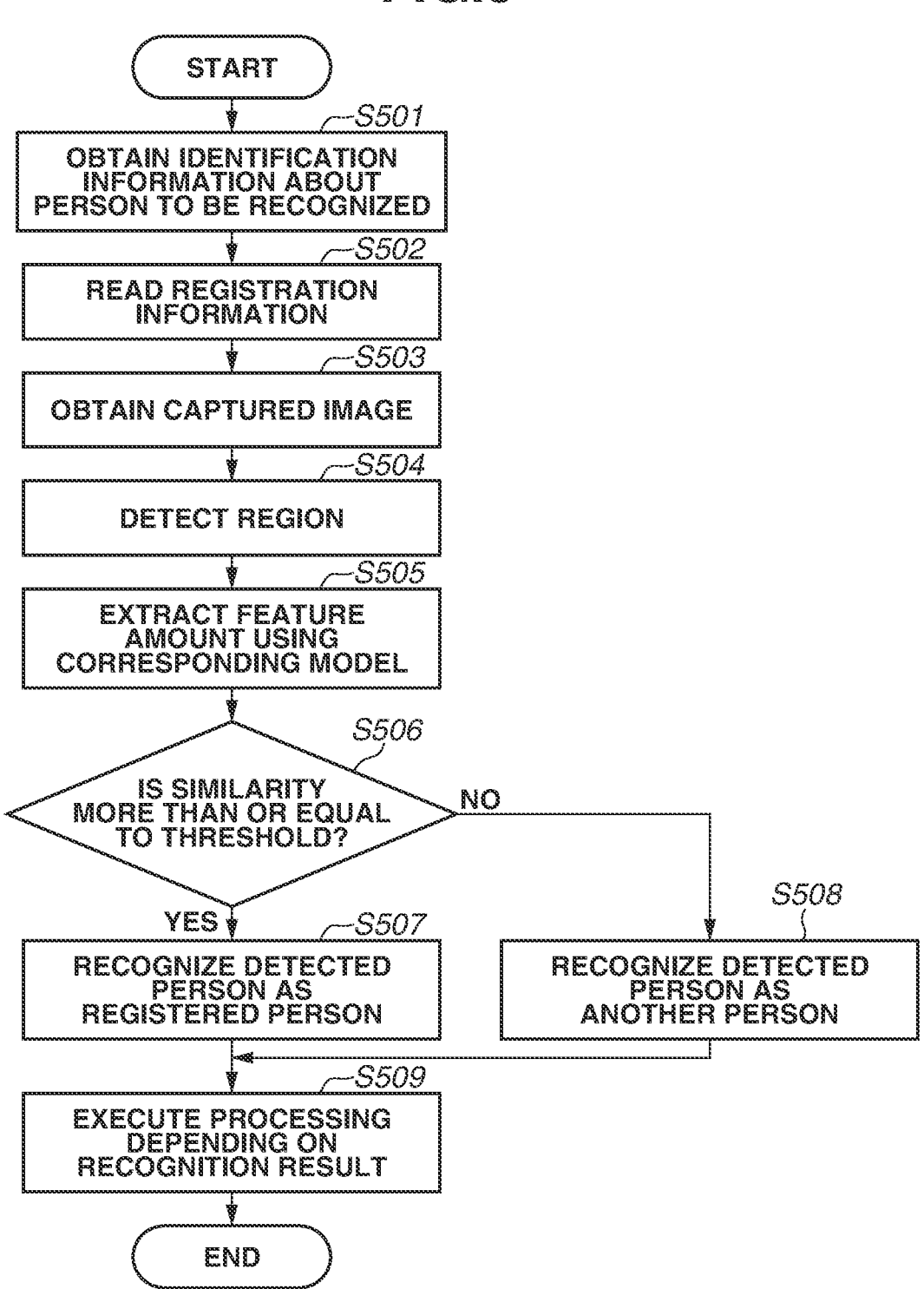
FIG. 5 is a flowchart illustrating a flow of recognition processing.

FIG. 5 is a flowchart illustrating a flow of collation processing to be executed by the collation apparatus 210.

First, in step S501, the identification information obtaining unit 213 obtains identification information unique to a person of a recognition target. The identification information obtaining unit 213 obtains the identification information about the person that is read from an ID card or a smartphone owned by the person of the recognition target by the information reading apparatus 140 that is provided, for example, at an entrance of the security gate 160. Thus, the collation apparatus 210 grasps the person to be subsequently recognized based on the identification information.

Next, in step S502, the registration information obtaining unit 214 reads the corresponding registration information from the DB 106 in the server 100 based on the identification information obtained by the identification information obtaining unit 213 in step S401. As illustrated in FIG. 4, the registration information is the information in which the identification information (person ID) about the registered person, the feature amount extracted from the face image when the person is registered, and the model information indicating which one of the first and second models is to be used for collation processing are associated. The registration information obtaining unit 214 makes an inquiry to the server 100 using the identification information unique to the person obtained in step S501 as a search key, and obtains the registration information sent from the server 100 in response to the inquiry.

The registration information obtaining processing in step S502 will be described in detail by way of an example of the above-described registration information 400 illustrated in FIG. 4. If the identification information (person ID) obtained by the identification information obtaining unit 213 indicates, for example, 00001, the system control unit 101 in the server 100 reads registration information from the registration information 400 stored in the DB 106 using the person ID as a search key. Specifically, the system control unit 101 of the server 100 reads the registration information corresponding to the person ID 00001 from the registration information 400 stored in the DB 106, and transmits the registration information to the information processing apparatus 110 via the communication unit 105. For example, if the person ID is 00003, the registration information corresponding to the person ID is read from the server 100, and the registration information is transmitted to the information processing apparatus 110. Accordingly, the registration information obtaining unit 214 that has received the registration information transmitted from the server 100 stores the registration information in the RAM 113 that is a memory in the information processing apparatus 110. The registration information is used for processing of step S405 and subsequent steps.

Next, in step S503, the image obtaining unit 211 of the collation apparatus 210 obtains an image including a face image of the person of the recognition target from the network camera 150 that is installed, for example, in front of the security gate 160.

Next, in step S504, the target detection unit 212 detects, as the face image, a face region of the person from the image obtained by the image obtaining unit 211. A known technique may be used as a technique for detecting an image of the face region, as in the target detection unit 202 of the registration apparatus 200.

Next, in step S505, the extraction unit 215 extracts a feature amount from the face image detected by the target detection unit 212. In this case, the extraction unit 215 extracts the feature amount using the learning model corresponding to the model information included in the registration information obtained in step S502. For example, if the registration information corresponding to the person ID 00001 illustrated in FIG. 4 is obtained, the extraction unit 215 extracts the feature amount using the second model corresponding to the model information (model A) included in the registration information corresponding to the person ID, i.e., the small-scale learning model with a small calculation amount. For example, if the registration information corresponding to the person ID 00003 is obtained, the extraction unit 215 extracts the feature amount using the first model corresponding to the model information (model B) included in the registration information corresponding to the person ID, i.e., the learning model with which an output with high accuracy can be obtained although the calculation amount is large.

Next, in step S506, the collation unit 216 calculates the similarity between the feature amount of the face of the registered person that is the feature amount included in the registration information obtained in step S502 and the feature amount extracted by the extraction unit 215 in step S505, and evaluates whether the similarity is more than or equal to a predetermined threshold. Any type of similarity may be used as the similarity between the feature amounts as long as multi-dimensional feature amounts can be compared. For example, a cosine similarity can be used. The cosine similarity can be represented by Formula (1) as follows. Formula (1) represents the cosine similarity between an n-dimensional feature vector p and an n-dimensional feature vector q. The cosine similarity is a value based on which an angle formed between two feature vectors can be evaluated as a distance between feature amounts, and takes a value range of −1.0 to 1.0. The value −1.0 indicates the lowest similarity between the feature vectors, and the value 1.0 indicates the highest similarity between the feature vectors.

$$\cos(\vec{p},\vec{q}) = \frac{\vec{p}\cdot\vec{q}}{|\vec{p}||\vec{q}|} \frac{\sum_{i=1}^{n} p_i q_i}{\sqrt{\sum_{i=1}^{n} p_i^2} \cdot \sqrt{\sum_{i=1}^{n} q_i^2}} \tag{1}$$

In step S506, if it is evaluated that the similarity is more than or equal to the predetermined threshold (YES in step S506), the processing proceeds to step S507. In step S507, the collation unit 216 recognizes the person corresponding to the face image detected in step S504 as the registered person. On the other hand, if it is evaluated that the similarity is less than the predetermined threshold (NO in step S506), the processing proceeds to step S508. In step S508, the collation unit 216 recognizes the person corresponding to the face image detected in step S504 as another person different from the registered person. The predetermined threshold used in step S506 is a preset value. For example, the predetermined threshold is a value set based on the accuracy with which the learning model is evaluated in advance. The accuracy with which the learning model is evaluated is set based on a false rejection rate that is the rate of recognition instances in which authorized persons are incorrectly rejected and a false acceptance rate that is the rate of recognition instances in which unauthorized persons are incorrectly accepted as authorized persons as a result of collation processing based on the feature amount extracted in advance by the learning model.

Next, in step S509, the collation unit 216 executes processing depending on the recognition result in step S507 or step S508. The collation unit 216 performs, for example, opening and closing of the security gate 160 based on the recognition result. Specifically, if the recognition result indicating that the person matches the registered person is obtained, the collation unit 216 opens the security gate 160 to allow the person to enter the security gate 160. On the other hand, if the recognition result indicating that the person is different from the registered person, the collation unit 216 closes the security gate 160 to reject entrance of the person. A gate opening/closing apparatus (not illustrated) may open and close the security gate 160, and the collation unit 216 may send a gate opening/closing control command depending on the recognition result to the gate opening/closing apparatus. A notification about the recognition result may be provided to, for example, the administrator terminal 130. In this case, the administrator terminal 130 may display the recognition result on a display or the like, or may output sound depending on the recognition result.

As described above, in the present exemplary embodiment, information indicating that the second model is to be used in collation processing to be performed at the security gate 160 is preliminarily registered as information about the person who can be recognized by use of the second model that is a learning model with low accuracy although the processing volume is small. This enables, for example, the information processing apparatus in which memories and calculation resources are insufficient to ensure the recognition accuracy in collation processing. In this case, the use of the small-scale second model with a smaller calculation amount makes it possible to reduce the processing time. On the other hand, information indicating that the first model, with which an output with high accuracy can be obtained although the calculation amount is large, is to be used may be registered as information about the person who cannot be accurately recognized by use of the second model, thereby ensuring the recognition accuracy in collation processing.

In the present exemplary embodiment, for example, the recognition system located at a security gate installed in an office building can be considered as a specific use case to which the recognition system is applied. It is assumed that users aged from twenties to fifties most frequently use the office building and the usage frequency of minors and elderly people is low. In the recognition system installed in such a place, in the case of learning the second model obtained after distillation, face images of persons that are highly likely to use the office building are intensively learned. As a result, the persons in the age group of twenties to fifties can be recognized with substantially the same accuracy as that when the first model supporting, for example, all age groups from minors to elderly people is used, even when the second model with which high-speed processing can be performed with a small calculation amount is used. On the other hand, there is a possibility that minors and elderly people use the office building, and thus such people may be incorrectly recognized when the second model is used. Accordingly, to recognize the people who may be incorrectly recognized, the first model with a high accuracy is used although a large calculation amount requires a long processing time. Thus, the use of the light second model for a large number of people that are more likely to use the office building and the use of the first model for people that are less likely to use the office building and may be incorrectly recognized make it possible to reduce the processing time for recognition processing while maintaining a higher accuracy in the entire processing.

The present exemplary embodiment describes an example where recognition processing is performed using a face image captured on site, for example, in front of the security gate 160. Thus, in the case of using a face image captured on site, it is assumed that there may be a difference between the feature amount of the face image used to generate registration information and the feature amount of the face image captured when collation processing is performed by the collation apparatus, for example, due to an external factor (such as a change in ambient light).

Assuming that there may be a difference between the feature amount of the face image during registration processing and the feature amount of the face image during collation processing, registration information update processing may be perform to register the feature amounts again in consideration of the difference between the feature amounts held as registration information. In the present exemplary embodiment, it is assumed that the registration information update processing in which the difference that may be generated between the feature amounts is taken into consideration is performed at a predetermined timing, or when a change in the external environment in which an image of the person of the recognition target is captured is sensed. After the feature amount in the registration information is updated, collation processing is performed using the updated feature amount.

Examples of the predetermined timing when the registration information is updated include a timing when hours of sunlight change due to a change of seasons such as summer or winter. At such timings, not only ambient light such as hours of sunlight changes, but also items (a face mask, sunglasses, etc.) worn by each person change. Thus, the feature amount in the registration information is updated at the predetermined timing to thereby make it possible to execute collation processing suitable for the timing.

Examples of sensing of a change in the external environment include sensing of a change in ambient light from an image, and sensing of a change in ambient light by an illuminance sensor or the like. Other examples of sensing of a change in the external environment include not only sensing of a change in ambient light, but also, for example, a change in an installation location of a camera, a change in an angle of field of the camera, and a change in layout of objects near the camera. The change in the installation location of the camera, the change in the angle of field of the camera, the change in layout of objects near the camera, and the like can be sensed based on, for example, a change in the appearance, composition, area, or the like of the location in the image captured by the camera, or a change in the position of the objects or the like. When such a change in the external environment is sensed, the feature amount in the registration information is updated to thereby make it possible to execute collation processing suitable for the external environment on a moment-to-moment basis.

As the processing of updating the feature amount in the registration information, for example, processing similar to the registration processing in the flowchart illustrated in FIG. 3 is performed again during the collation processing, and the registration information is updated based on information obtained by the processing. Specifically, the first feature amount extraction processing and the second feature amount extraction processing are performed, as in step S304, on the face image detected from an image newly captured by the network camera 150. Further, feature amount comparison processing similar to the processing of step S305 is performed. In the feature amount comparison processing in step S305, if it is determined that the similarity between the first feature amount and the second feature amount is more than or equal to the threshold (YES in step S305), the processing proceeds to step S306. In step S306, the person is registered as the person to which the second model is applied. On the other hand, if it is determined that the similarity between the first feature amount and the second feature amount is less than the threshold in the feature amount comparison processing (NO in step S305), the processing proceeds to step S307. In step S307, the person is registered as the person to which the first model is applied. In the collation processing performed by the collation apparatus, the registration information is already stored in the DB 106. Accordingly, in steps S306 and S307, the registration information stored in the DB 106 is updated. Specifically, the comparison of the feature amounts extracted from the face image including an external factor in an environment in which collation processing is actually performed by the collation apparatus makes it possible to use registration information suitable for the timing and the external environment. Consequently, highly accurate collation processing can be achieved.

As described above, according to the first exemplary embodiment, in the case of registering a person, one of the first model and the second model to be used in the subsequent collation processing is determined in advance and information about one of the first model and the second model to be used is registered, so that it is possible to perform high-speed processing while maintaining a high recognition accuracy during the collation processing.

In addition to the above-described example of the entry and exit management in the office building, the following use case can also be considered as an example where the registration processing and the collation processing are performed.

For example, face image capturing and registration processing are performed when a person enters a security gate, for example, to go to work in the morning. After that, face image capturing and collation processing may be performed when the person passes through another gate in the office building. After that, when the person leaves the office building, for example, after work, registration information may be reset. For example, once registration information is registered when the person enters the security gate, the registration information is held in a server except for a case where the registration information needs to be updated later. Accordingly, the registration processing to be performed when the person enters the office building, for example, next day, may be skipped. The present exemplary embodiment can also be applied to, for example, a use case in which registration information is generated based on a face image that is a still image or the like properly captured in advance from the front side of the person, and the generated registration information is preliminarily registered in the server or the like and is used for collation processing not only in the office building, but also in various locations.

The present exemplary embodiment can be applied not only to the office building, but also to facilities such as a station building, a retailer, and a bank.

In addition, the recognition system according to the present exemplary embodiment can also be applied to a use case in which the above-described registration processing is performed when a person checks in at an airport and the collation processing is performed when the person passes through a security check point for baggage inspection or the like, or a boarding gate to an airplane. In the case of application of the recognition system according to the present exemplary embodiment to an airport, identification information recorded on a passport such as an e-passport can be used as identification information unique to the person, and a face image recorded on the e-passport can be used as the face image to be used for the registration processing. Further, identification information and a face image registered in a member registration system of an airline or the like may be used as the identification information and the face image.

While the above-described exemplary embodiment describes an example where one second model generated by distillation using the first model is used, a plurality of second models generated by distillation may be used. For example, a plurality of learning models with different calculation amounts that are generated by distillation using the first model may be used as the second models. In this example, the registration apparatus 200 compares pieces of feature information respectively extracted by the first model and the plurality of second models, and includes model information indicating which one of the first model and the plurality of second models is to be used for collation processing in the registration information based on the comparison result. The collation apparatus 210 determines which one of the models, i.e., the first model or any one of the plurality of second models, is used based on the model information included in the registration information. In this example, any one of the plurality of light second models may be appropriately selected depending on the amount of memory and processing capability of the collation apparatus 210. In this example, any one of the plurality of light second models may be appropriately selected depending on the predetermined timing or sensing of a change in the external environment as described above.

Next, a second exemplary embodiment describes an example where collation processing is performed on a person or an object of a tracking target. The second exemplary embodiment describes an example of tracking a specific person using an image captured by a monitoring camera. A system configuration according to the second exemplary embodiment is substantially the same as that illustrated in FIG. 1, except that the network camera 150 is a monitoring camera. In the second exemplary embodiment, the security gate 160 can be omitted. A functional block configuration of an information processing apparatus according to the second exemplary embodiment is similar to that illustrated in FIGS. 2A and 2B. Accordingly, illustration of the functional block configuration of the information processing apparatus is omitted, and descriptions of components and processes similar to those of the first exemplary embodiment are also omitted.

Registration processing to be performed by a registration apparatus 200 according to the second exemplary embodiment will be described with reference to the flowchart illustrated in FIG. 3.

First, in step S301, the image obtaining unit 201 of the registration apparatus 200 obtains an image from the network camera 150. Since the monitoring camera is used as the network camera 150 in the second exemplary embodiment, a captured image of a region to be monitored is obtained. If a person passes through the region to be monitored, an image including the person is obtained.

Next, in step S302, the target detection unit 202 detects an image (whole body image, upper body image, etc.) of the person from the image captured by the monitoring camera. In the second exemplary embodiment, the target detection unit 202 detects a person of a tracking target, and further detects a whole body image of the detected person. A known method may be used as a method of detecting a person of a tracking target from an image captured by the monitoring camera. Examples of the method include a method of detecting, as a candidate region, a region that is more likely to be a person region based on preset features of the person, such as head, body, and limbs, and a method of detecting a person region by learning as typified by deep learning. Further, known techniques described above in the first exemplary embodiment can be used as the image detection technique. The number of persons to be detected is not limited to one. A plurality of persons may be detected.

Figure 6:
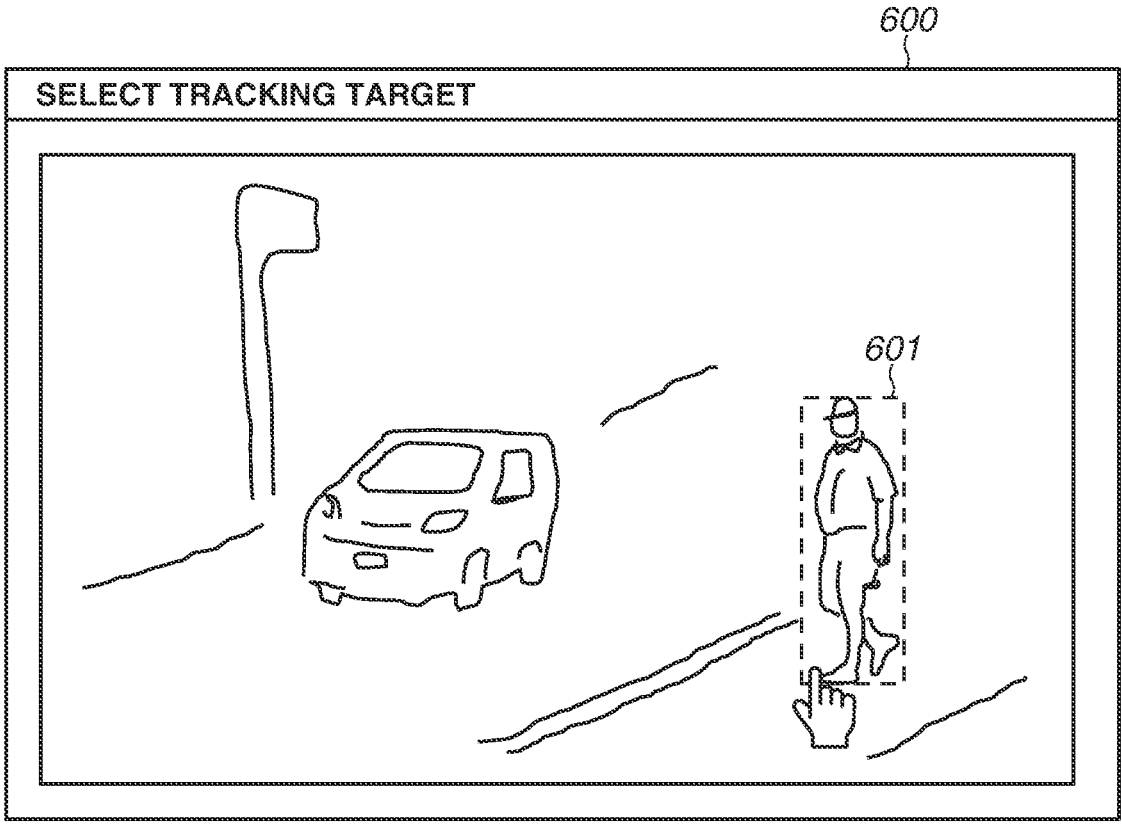
FIG. 6 is a diagram illustrating a screen example during registration according to a second exemplary embodiment.

In the person detection method of detecting a person from a captured image, the detected person is surrounded by a detection frame in many cases. FIG. 6 illustrates an example where the person detected from the captured image is indicated by a detection frame 601. FIG. 6 illustrates an example of a state where the captured image is displayed on a display screen 600 of the administrator terminal 130, and the detection frame 601 is displayed when the person is detected in the captured image. A user such as an administrator may designate the person detected in the captured image as a tracking target. FIG. 6 illustrates an example where the administrator of the administrator terminal 130 designates the tracking target. In the example illustrated in FIG. 6, the person indicated by the detection frame 601 is selected as the tracking target on a screen of a tablet terminal that is the administrator terminal 130. Specifically, the administrator selects the person indicated by the detection frame 601 as the tracking target, for example, by touching the detection frame 601 on the screen of the tablet terminal.

Next, in step S303, the first extraction unit 203 performs the first feature amount extraction processing on the image of the person selected as the tracking target as described above, and the second extraction unit 204 performs the second feature amount extraction processing, as in the first exemplary embodiment.

Next, in step S304, the comparison unit 205 performs the processing of comparing the first feature amount with the second feature amount, as in the first exemplary embodiment.

After that, as in the first exemplary embodiment, in step S305, it is evaluated whether the similarity is more than or equal to the threshold, and then the registration information registering processing in step S306 or step S307 is performed based on an evaluation result.

Tracking processing according to the second exemplary embodiment will be described below with reference to the flowchart illustrated in FIG. 5. It is assumed that the tracking processing according to the second exemplary embodiment is performed by the collation apparatus 210 illustrated in FIG. 2B.

While the identification information obtaining unit 213 obtains identification information unique to the person of the recognition target in step S501 in the first exemplary embodiment described above, an identification information obtaining unit 213 according to the second exemplary embodiment obtains identification information about the tracking target. As a method for obtaining the identification information about the tracking target, for example, the administrator can input identification information (person ID) via the administrator terminal 130. For example, if the person corresponding to the person ID 00001 in the registration information already stored in the DB 106 is to be set as the tracking target, the administrator inputs the person ID 00001.

Next, in step S502, the registration information obtaining unit 214 reads registration information from the DB 106 in the server 100 based on the identification information. The registration information is information registered by the registration apparatus 200 according to the second exemplary embodiment as described above. The registration information obtaining unit 214 obtains the registration information corresponding to the identification information from the server 100.

Next, in step S503, the image obtaining unit 211 obtains an image of the region to be monitored captured by the monitoring camera (network camera 150).

Next, in step S504, the target detection unit 212 detects the person of the tracking target and the whole body image of the person from the captured image obtained by the image obtaining unit 211. Prior to the detection processing, a candidate region for the tracking target is detected from the captured image. Specifically, if a person is set as the tracking target, the target detection unit 212 detects a region that is more likely to be a person region from the image as a candidate region. The above-described known methods can be used as the method of detecting a region that is more likely to be a person region. Examples of the methods include a detection method based on preset features of the person such as head, body, and limbs, and a method of detecting a person region by learning as typified by deep learning. The number of persons to be detected is not limited to one. A plurality of persons may be detected.

Next, in step S505, the extraction unit 215 extracts a feature amount from the whole body image detected by the target detection unit 212. In the second exemplary embodiment, the feature amount can be obtained as in the first exemplary embodiment by replacement of the face image with the whole body image. Specifically, in the case of extracting the feature amount from the whole body image, the extraction unit 215 extracts the feature amount using the learning model corresponding to model information included in the registration information obtained in step S502.

In the subsequent steps S506 to S508, the collation unit 216 determines whether the person matches the person of the tracking target based on the feature amount extracted in step S505, as in the first exemplary embodiment.

After that, in step S509, the collation unit 216 executes processing depending on the recognition result in step S507 or step S508. In the second exemplary embodiment, the collation unit 216 performs tracking display processing to display, for example, a rectangular frame surrounding the recognized tracking target on a screen and following the movement of the tracking target based on the recognition result.

In the second exemplary embodiment, one of the first model and the second model to be used for processing on the person of the tracking target is determined and registered in advance, so that it is possible to perform detection and tracking processing by use of an appropriate learning model during person tracking processing. Consequently, high-speed person tracking processing can be achieved while a higher tracking accuracy is maintained.

The present disclosure can also be implemented by processing in which a program for implementing one or more functions according to the above-described exemplary embodiments is supplied to a system or an apparatus via a network or a storage medium, and one or more processors in a computer of the system or the apparatus read and execute the program. The present disclosure can also be implemented by a circuit (e.g., an application-specific integrated circuit (ASIC)) for implementing the above-described one or more functions.

The above-described exemplary embodiments are merely specific examples for carrying out the present disclosure, and the technical scope of the present disclosure should not be interpreted in a limited manner by these specific examples.

In other words, the present disclosure can be carried out in various forms without departing from the technical idea or main features thereof.

The present disclosure includes the following configurations, methods, and storage media.

(Configuration 1)

An information processing apparatus includes a first extraction unit configured to perform first extraction processing on an image of a registration target to extract first feature information indicating a feature of the registration target, a second extraction unit configured to perform second extraction processing on the image of the registration target to extract second feature information comparable to the first feature information, a comparison unit configured to compare the first feature information with the second feature information, and a registration unit configured to register registration information associated with the registration target, the registration information indicating which one of the first extraction processing and the second extraction processing is to be used for collation processing based on a result of comparison by the comparison unit.

(Configuration 2)

In the information processing apparatus according to Configuration 1, the second extraction processing has a smaller calculation amount for processing of extracting the feature information than the first extraction processing.

(Configuration 3)

In the information processing apparatus according to Configuration 1 or 2, the second extraction processing uses a configuration for extracting the feature information smaller in scale than the configuration for the first extraction processing.

(Configuration 4)

In the information processing apparatus according to any one of Configurations 1 to 3, the first extraction unit extracts the first feature information by the first extraction processing using a first model generated by learning, and the second extraction unit extracts the second feature information by the second extraction processing using a second model generated by knowledge distillation using the first model.

(Configuration 5)

In the information processing apparatus according to Configuration 4, the second extraction unit extracts a plurality of pieces of second feature information using a plurality of second models generated by the knowledge distillation using the first model, the comparison unit compares the first feature information with each of the plurality of pieces of second feature information, and the registration unit generates registration information associated with the registration target based on a result of comparison by the comparison unit, the registration information indicating which one of the first extraction processing using the first model and any piece of second extraction processing among a plurality of pieces of second extraction processing using the plurality of second models is used for the collation processing.

(Configuration 6)

In the information processing apparatus according to any one of Configurations 1 to 5, the comparison unit calculates a distance between the first feature information and the second feature information, and, in a case where the distance calculated by the comparison unit is less than or equal to a predetermined threshold, the registration unit uses the second extraction processing for the collation processing.

(Configuration 7)

In the information processing apparatus according to any one of Configurations 1 to 6, the registration unit generates the registration information in which identification information unique to the registration target is associated with information indicating which one of the first extraction processing and the second extraction processing is to be used for collation processing and feature information extracted by one of the first extraction processing and the second extraction processing to be used for the collation processing.

(Configuration 8)

The information processing apparatus according to any one of Configurations 1 to 7, further includes an image obtaining unit configured to obtain a captured image including the registration target, and a detection unit configured to detect an image of the registration target from the captured image. The first extraction unit extracts the first feature amount from the detected image of the registration target, and the second extraction unit extracts the second feature amount from the detected image of the registration target.

(Configuration 9)

In the information processing apparatus according to Configuration 8, at a predetermined timing, the image obtaining unit obtains a newly captured image of the registration target and performs processing from detection processing by the detection unit to registration processing by the registration unit based on the newly captured image of the registration target to update the registration information.

(Configuration 10)

In the information processing apparatus according to Configuration 9, the predetermined timing is one of a timing when seasons change and a timing when hours of sunlight change.

(Configuration 11)

The information processing apparatus according to Configuration 8, further includes a sensing unit configured to sense a change in an external environment. In a case where the change in the external environment is sensed, the image obtaining unit obtains a newly captured image of the registration target and performs processing from detection processing by the detection unit to registration processing by the registration unit based on the newly captured image of the registration target to update the registration information.

(Configuration 12)

In the information processing apparatus according to Configuration 11, the sensing unit senses, as the change in the external environment, at least one of a change in ambient light, a change in an installation location of an image capturing apparatus configured to obtain a captured image of the registration target, a change in an angle of field of the image capturing apparatus, and a change in layout of objects near the image capturing apparatus.

(Configuration 13)

In the information processing apparatus according to any one of Configurations 1 to 12, the image of the registration target is a face image of a person.

(Configuration 14)

An information processing apparatus includes a detection unit configured to detect an image of a recognition target from a captured image including the recognition target, a registration information obtaining unit configured to obtain registration information registered by an information processing apparatus according to any one of Configurations 1 to 13, and an extraction unit configured to extract feature information from the image of the recognition target based on the registration information obtained by the registration information obtaining unit, and a collation unit configured to perform collation processing to determine whether the recognition target matches a registration target by use of the feature information extracted by the extraction unit.

(Configuration 15)

The information processing apparatus according to Configuration 14, further includes an identification information obtaining unit configured to obtain identification information about the recognition target. The registration information obtaining unit obtains registration information about the registration target identified based on the identification information from a database storing the registration information.

(Configuration 16)

In the information processing apparatus according to Configuration 15, the detection unit tracks the recognition target identified based on the identification information.

(Method 1)

An information processing method to be executed by an information processing apparatus includes performing first extraction processing on an image of a registration target to extract first feature information indicating a feature of the registration target, performing second extraction processing on the image of the registration target to extract second feature information comparable to the first feature information, comparing the first feature information with the second feature information, and registering registration information associated with the registration target, the registration information indicating which one of the first extraction processing and the second extraction processing is to be used for collation processing based on a result of comparison.

(Method 2)

An information processing method to be executed by an information processing apparatus includes detecting an image of a recognition target from a captured image including the recognition target, obtaining registration information registered by an information processing apparatus according to claim 1, extracting feature information from the image of the recognition target based on the obtained registration information, and performing collation processing to determine whether the recognition target matches a registration target by use of the extracted feature information.

(Storage Medium 1)

A non-transitory computer-readable storage medium stores a program for causing a computer to function as an information processing apparatus according to any one of Configurations 1 to 13.

(Storage Medium 2)

A non-transitory computer-readable storage medium stores a program for causing a computer to function as an information processing apparatus according to any one of Configurations 14 to 16.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-094980, filed Jun. 13, 2022, which is hereby incorporated by reference herein in its entirety.

What is claimed is:

1. An information processing apparatus comprising:

at least one memory storing instructions; and at least one processor that, upon execution of the instructions, is configured to operate as:

a first extraction unit configured to perform first extraction processing on an image of a registration target, the first extraction processing extracting first feature information indicating a feature of the registration target;

a second extraction unit configured to perform second extraction processing on the image of the registration target, the second extraction processing extracting second feature information;

a comparison unit configured to obtain a similarity between the first feature information and the second feature information; and 23
24 a registration unit configured to register, in association with the registration target, registration information that is determined based on the similarity, and that indicates which one of the first extraction processing and the second extraction processing is to be used in collation processing for the registration target.

2. The information processing apparatus according to claim 1, wherein the second extraction processing requires smaller computation resources for processing of extracting the feature information than the first extraction processing.

3. The information processing apparatus according to claim 1, wherein, to extract the feature information, the second extraction processing uses a smaller learning model than a learning model for the first extraction processing.

4. The information processing apparatus according to claim 1,
   wherein the first extraction unit extracts the first feature information by the first extraction processing using a first learning model, and
   wherein the second extraction unit extracts the second feature information by the second extraction processing using a second learning model generated by knowledge distillation using the first learning model.

5. The information processing apparatus according to claim 4,
   wherein the second extraction unit extracts a plurality of pieces of second feature information using a plurality of second learning models generated by the knowledge distillation using the first learning model,
   wherein the comparison unit compares the first feature information with each of the plurality of pieces of second feature information, and
   wherein the registration unit generates registration information associated with the registration target based on a result of comparison by the comparison unit, the registration information indicating which one of the first extraction processing using the first learning model and any piece of second extraction processing among a plurality of pieces of second extraction processing using the plurality of second learning models is used for the collation processing.

6. The information processing apparatus according to claim 1,
   wherein the comparison unit calculates a distance between the first feature information and the second feature information, and
   wherein, in a case where the distance calculated by the comparison unit is less than or equal to a predetermined threshold, the registration unit uses the second extraction processing for the collation processing.

7. The information processing apparatus according to claim 1, wherein the registration unit generates the registration information in which identification information unique to the registration target is associated with information indicating which one of the first extraction processing and the second extraction processing is to be used for collation processing and feature information extracted by one of the first extraction processing and the second extraction processing to be used for the collation processing.

8. The information processing apparatus according to claim 1,
   wherein the at least one processor is further configured to operate as:
   an image obtaining unit configured to obtain a captured image including the registration target, from a camera; and a detection unit configured to detect an image of the registration target from the captured image,
   wherein the first extraction unit extracts the first feature amount from the detected image of the registration target, and
   wherein the second extraction unit extracts the second feature amount from the detected image of the registration target.

9. The information processing apparatus according to claim 8, wherein, at a predetermined timing, the image obtaining unit obtains a newly captured image of the registration target and performs processing from detection processing by the detection unit to registration processing by the registration unit based on the newly captured image of the registration target to update the registration information.

10. The information processing apparatus according to claim 9, wherein the predetermined timing is one of a timing when seasons change and a timing when hours of sunlight change.

11. The information processing apparatus according to claim 8, further comprising a sensing unit configured to sense a change in an external environment,
   wherein, in a case where the change in the external environment is sensed, the image obtaining unit obtains a newly captured image of the registration target and performs processing from detection processing by the detection unit to registration processing by the registration unit based on the newly captured image of the registration target to update the registration information.

12. The information processing apparatus according to claim 11, wherein the sensing unit senses, as the change in the external environment, at least one of a change in ambient light, a change in an installation location of an image capturing apparatus configured to obtain a captured image of the registration target, a change in an angle of field of the image capturing apparatus, and a change in layout of objects near the image capturing apparatus.

13. The information processing apparatus according to claim 1, wherein the image of the registration target is an image of a person's face.

14. An information processing apparatus comprising:
   at least one memory storing instructions; and
   at least one processor that, upon execution of the instructions, is configured to operate as:
   a detection unit configured to detect an image of a recognition target from a captured image including the recognition target;
   a registration information obtaining unit configured to obtain registration information registered by the information processing apparatus according to claim 1;
   an extraction unit configured to extract feature information from the image of the recognition target based on the registration information obtained by the registration information obtaining unit; and
   a collation unit configured to perform collation processing to determine whether the recognition target matches a registration target by use of the feature information extracted by the extraction unit.

15. The information processing apparatus according to claim 14,
   wherein the at least one processor is further configured to operate as an identification information obtaining unit configured to obtain identification information about the recognition target, and
   wherein the registration information obtaining unit obtains registration information about the registration target identified based on the identification information from a database storing the registration information.

16. The information processing apparatus according to claim 15, wherein the detection unit tracks the recognition target identified based on the identification information.

17. An information processing method to be executed by an information processing apparatus, the information processing method comprising:

performing first extraction processing on an image of a registration target, the first extraction processing extracting first feature information indicating a feature of the registration target;

performing second extraction processing on the image of the registration target, the second extraction processing extracting second feature information;

obtaining a similarity between the first feature information and the second feature information; and registering, in association with the registration target, registration information that is determined based on the similarity, and that indicates which one of the first extraction processing and the second extraction processing is to be used in collation processing for the registration target.

18. An information processing method to be executed by an information processing apparatus, the information processing method comprising:

detecting an image of a recognition target from a captured image including the recognition target;

obtaining registration information registered by an information processing apparatus according to claim 1;

extracting feature information from the image of the recognition target based on the obtained registration information; and performing collation processing to determine whether the recognition target matches a registration target by use of the extracted feature information.

19. A non-transitory computer-readable storage medium storing instructions that, upon execution by a processor of an information processing apparatus, configure the information processing apparatus to operate as:

a first extraction unit configured to perform first extraction processing on an image of a registration target, the first extraction processing extracting first feature information indicating a feature of the registration target;

a second extraction unit configured to perform second extraction processing on the image of the registration target, the second extraction processing extracting second feature information;

a comparison unit configured to obtain a similarity between the first feature information and the second feature information; and a registration unit configured to register, in association with the registration target, registration information that is determined based on the similarity, and that indicates which one of the first extraction processing and the second extraction processing is to be used in collation processing for the registration target.

20. A non-transitory computer-readable storage medium storing instructions that, upon execution by a processor of an information processing apparatus, configure the information processing apparatus to operate as:

a detection unit configured to detect an image of a recognition target from a captured image including the recognition target;

a registration information obtaining unit configured to obtain registration information registered by the information processing apparatus according to claim 1;

an extraction unit configured to extract feature information from the image of the recognition target based on the registration information obtained by the registration information obtaining unit; and a collation unit configured to perform collation processing to determine whether the recognition target matches a registration target by use of the feature information extracted by the extraction unit.

* * * * *